March 1, 1966  R. P. GARVEY  3,237,807
FEEDING APPARATUS
Filed Nov. 4, 1963  8 Sheets-Sheet 1

INVENTOR
ROBERT P. GARVEY
BY
Rudolph L. Lowell
ATTORNEY

March 1, 1966
R. P. GARVEY
3,237,807
FEEDING APPARATUS
Filed Nov. 4, 1963
8 Sheets-Sheet 2
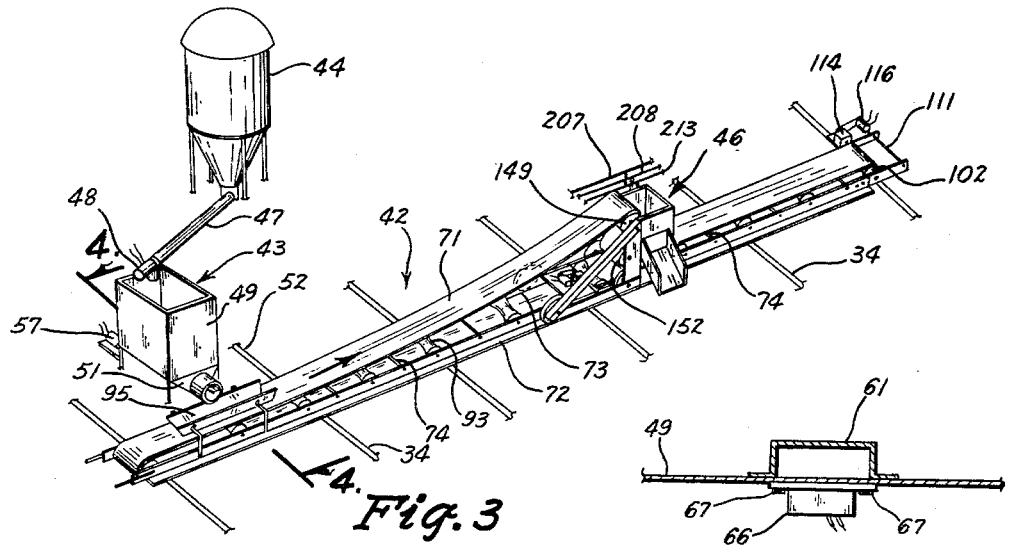
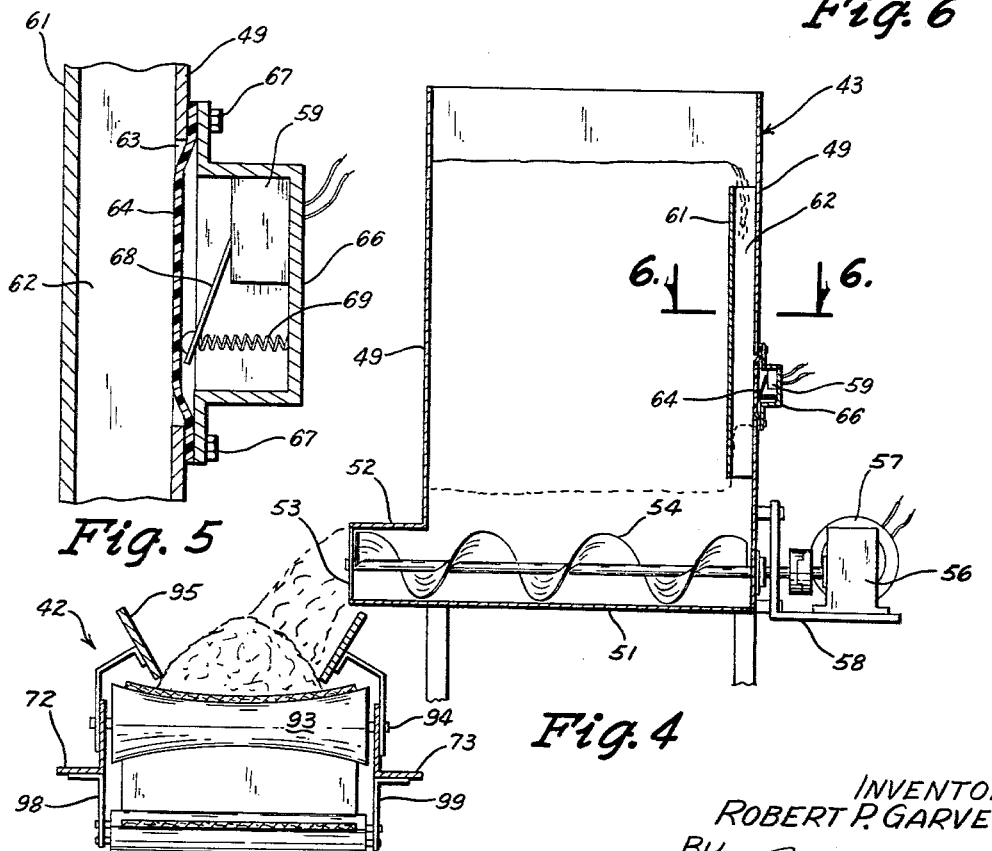
INVENTOR
ROBERT P. GARVEY
BY
Rudolph L. Lowell
ATTORNEY March 1, 1966 R. P. GARVEY 3,237,807
FEEDING APPARATUS
Filed Nov. 4, 1963 8 Sheets-Sheet 3
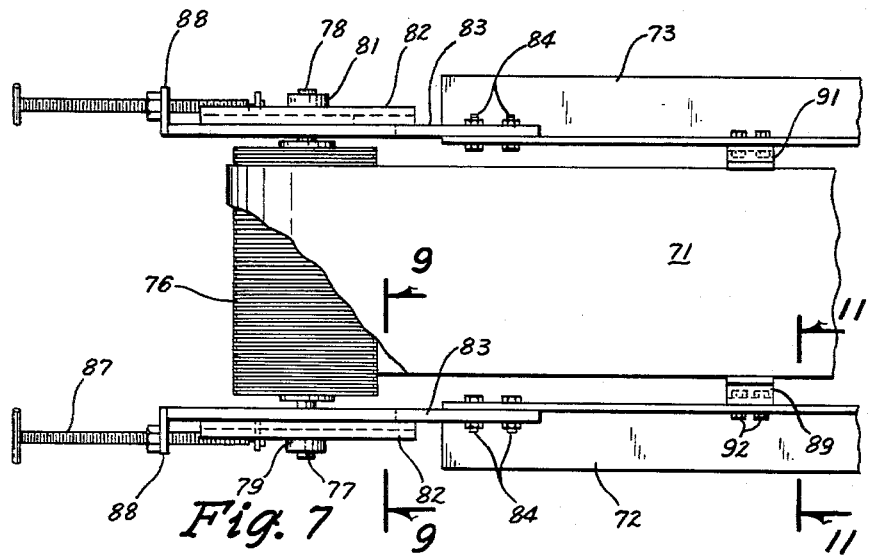
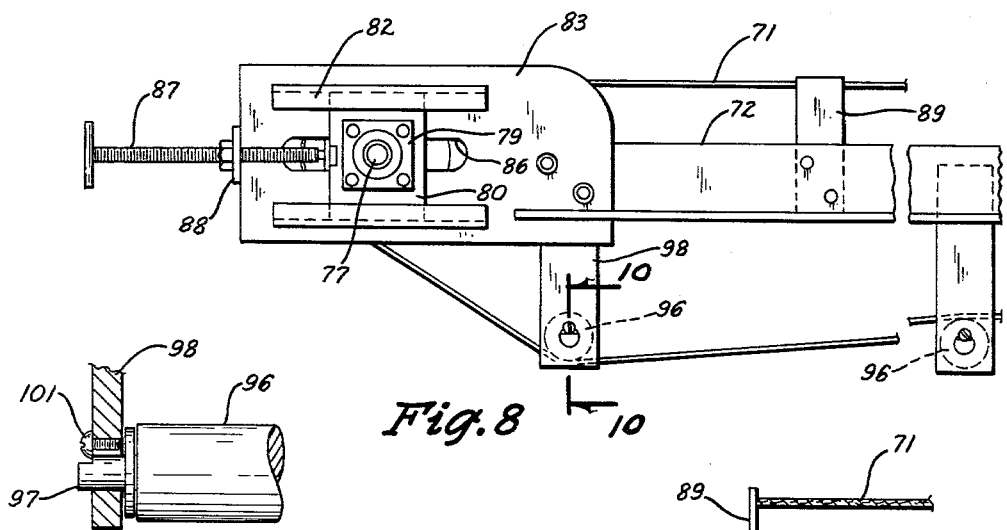
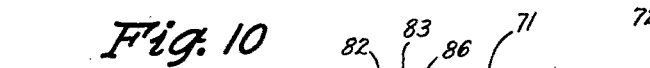
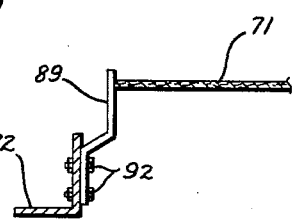
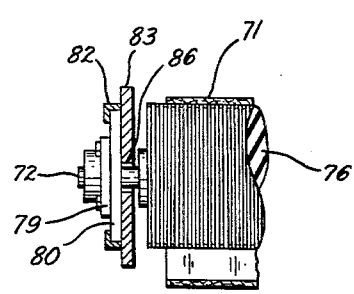
INVENTOR
ROBERT P. GARVEY
BY
ATTORNEY

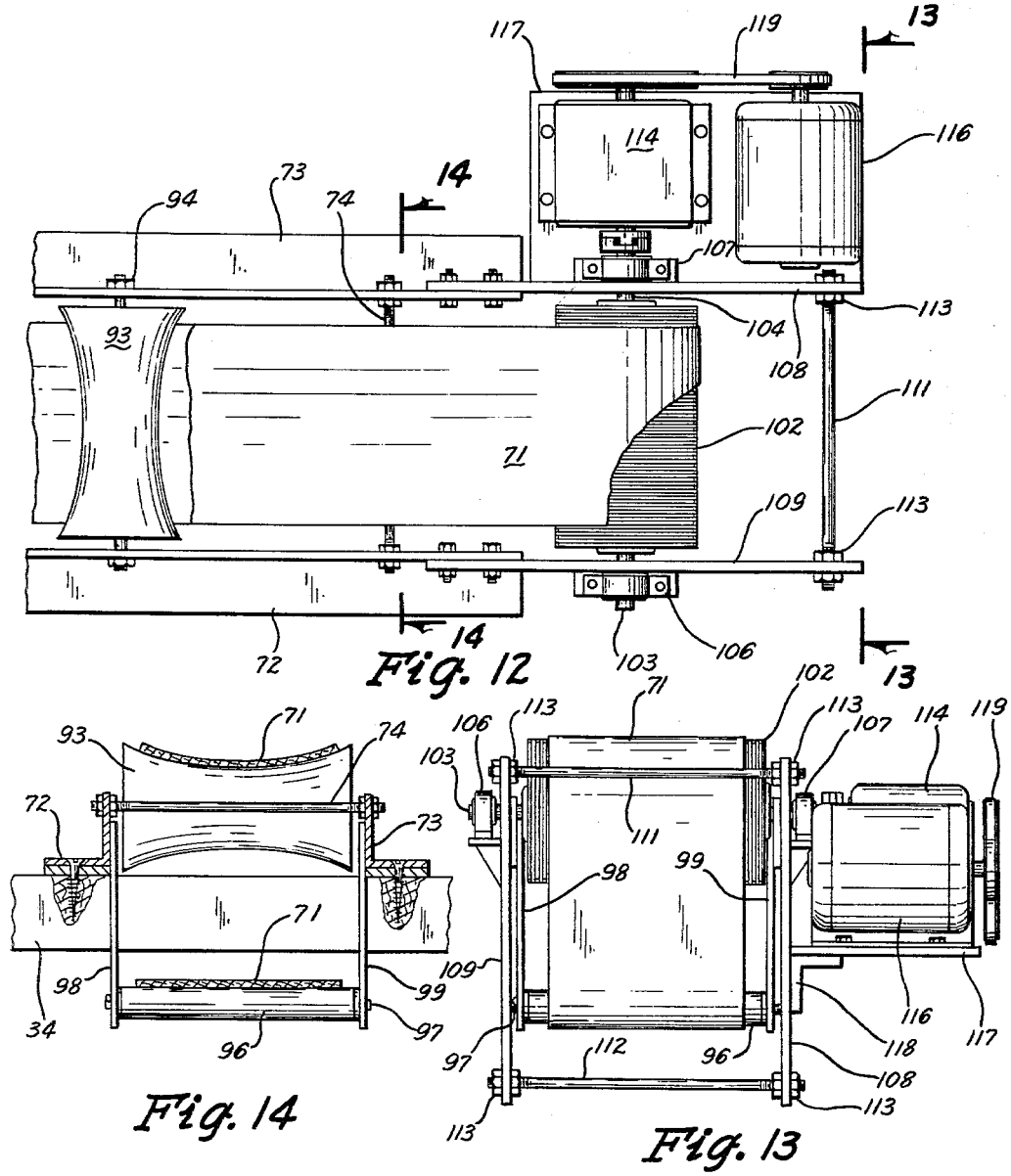

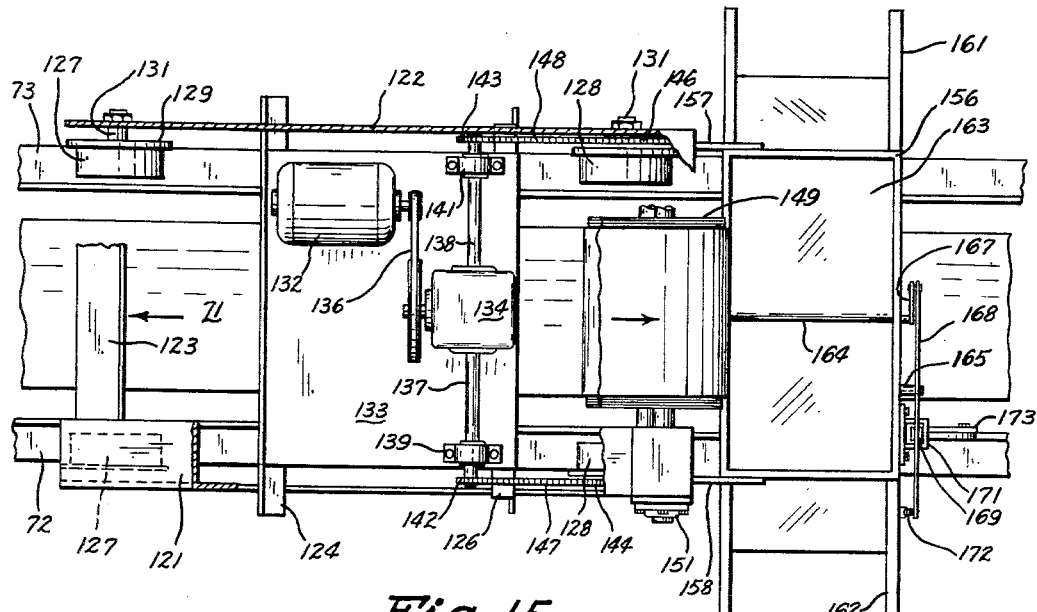
Fig. 15
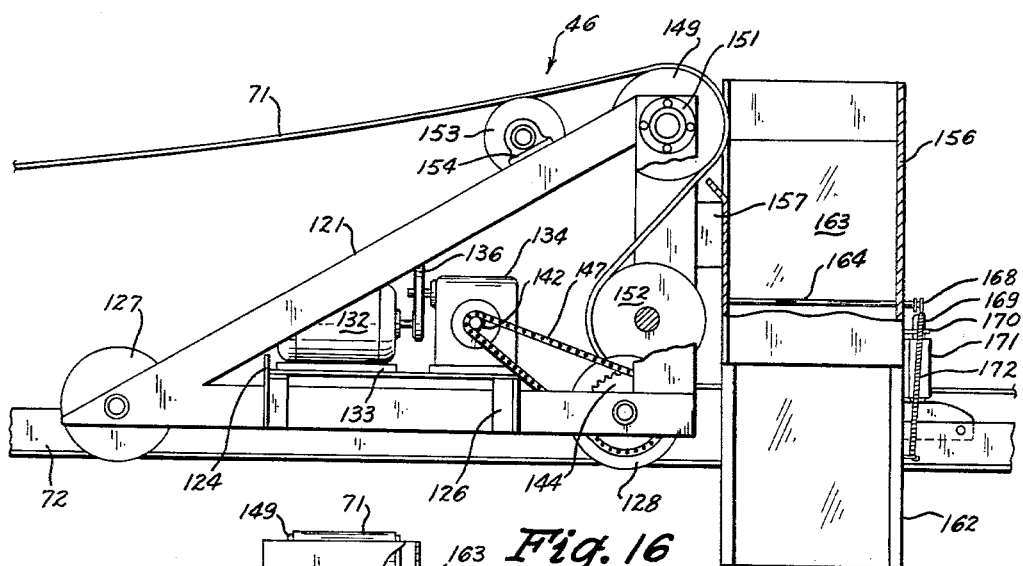
Fig. 16
Fig. 17
INVENTOR
ROBERT P. GARVEY
BY
ATTORNEY March 1, 1966 R. P. GARVEY 3,237,807
FEEDING APPARATUS
Filed Nov. 4, 1963 8 Sheets-Sheet 6
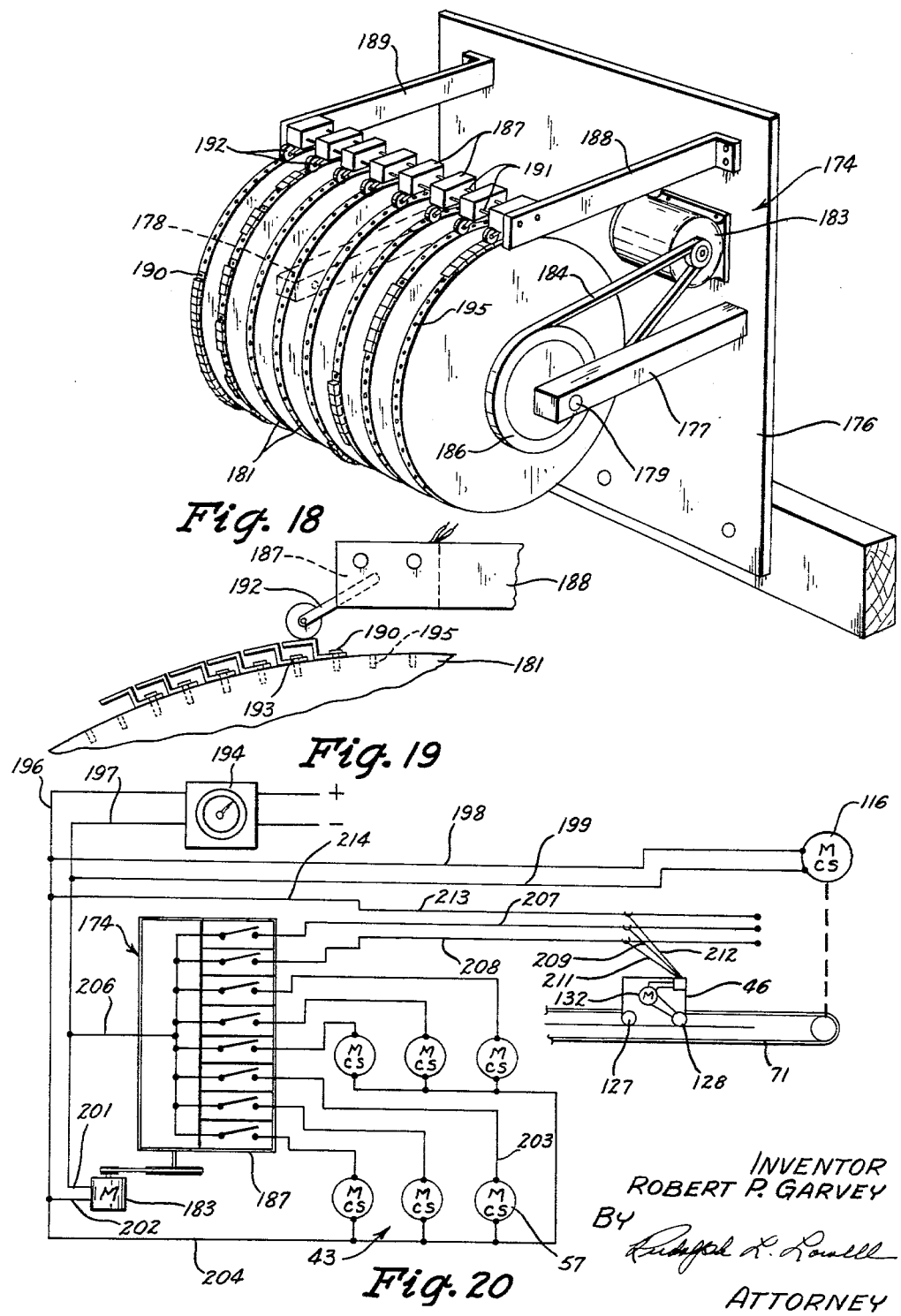

March 1, 1966 R. P. GARVEY 3,237,807
FEEDING APPARATUS
Filed Nov. 4, 1963 8 Sheets-Sheet 7

INVENTOR
ROBERT P. GARVEY
BY
ATTORNEY

United States Patent Office 3,237,807
Patented Mar. 1, 1966

3,237,807
FEEDING APPARATUS
Robert P. Garvey, South Sioux City, Nebr., assignor to Garvey Manufacturing Co., Inc., South Sioux City, Nebr., a corporation of Nebraska
Filed Nov. 4, 1963, Ser. No. 321,114
8 Claims. (Cl. 222—56)

This invention relates to a bulk material conveying and dispensing apparatus and more particularly to a feeding apparatus and method for supplying livestock with feed at predetermined times in predetermined quantities.

It is the object of this invention to provide an improved feeding apparatus for automatically distributing feed to livestock, such as hogs, cattle, horses, or poultry.

Another object of the invention is to provide a livestock feeding apparatus which is operable to distribute the same or different types of feed rations, in the same or different quantities, to a plurality of separate feeding stations having segregated groups of livestock.

Still another object of the invention is to provide an improved method of distributing rations to separate feeding stations.

A further object of the invention is to provide a livestock feeding apparatus which is automatic in operation to periodically discharge at preselected times predetermined quantities of feed to a plurality of separate livestock feeding stations without the necessity of the presence of an attendant.

Another object of the invention is to provide a livestock feeding apparatus having at least one feed hopper unit which is automatically refilled when the feed in the hopper unit falls below a selected level.

An additional object of the invention is to provide a versatile feeding apparatus which is adaptable to both large and small livestock feeding operations and is reliable and efficient in use.

These and other objects and advantages of the invention will become readily apparent upon reference to the following description and accompanying drawing, wherein:

FIG. 3 is a perspective view of the feeding apparatus of FIG. 1;

FIG. 4 is an enlarged sectional view taken along the line 4—4 of FIG. 3;

FIG. 5 is an enlarged detail sectional view of the feed control of the hopper unit shown in FIG. 4;

FIG. 6 is an enlarged sectional view taken along the line 6—6 of FIG. 4;

FIG. 7 is a plan view of the forward end section of the feeding apparatus of FIG. 1;

FIG. 8 is a side view of FIG. 7;

FIG. 9 is a sectional view taken along the line 9—9 of FIG. 7;

FIG. 10 is an enlarged sectional detail view taken along the line 10—10 of FIG. 8;

FIG. 11 is an enlarged sectional detail view taken along the line 11—11 of FIG. 7;

FIG. 12 is a plan view of the rear end section of the feeding apparatus of FIG. 1;

FIG. 13 is a view taken along the line 13—13 of FIG. 12;

FIG. 14 is a sectional view taken along the line 14—14 of FIG. 12;

FIG. 15 is a plan view of the truck of the feeding apparatus of FIG. 1;

FIG. 16 is a side view of FIG. 15 partly in section;

FIG. 17 is a reduced end view looking toward the left of FIG. 15;

FIG. 18 is a perspective view of the motor sequence control unit used in the feeding apparatus of FIG. 1;

FIG. 19 is an enlarged fragmentary side view of the switch control of the unit of FIG. 18;

FIG. 20 is a block diagram of the electric circuit of the feeding apparatus of FIG. 1;

Figures 1, 2:
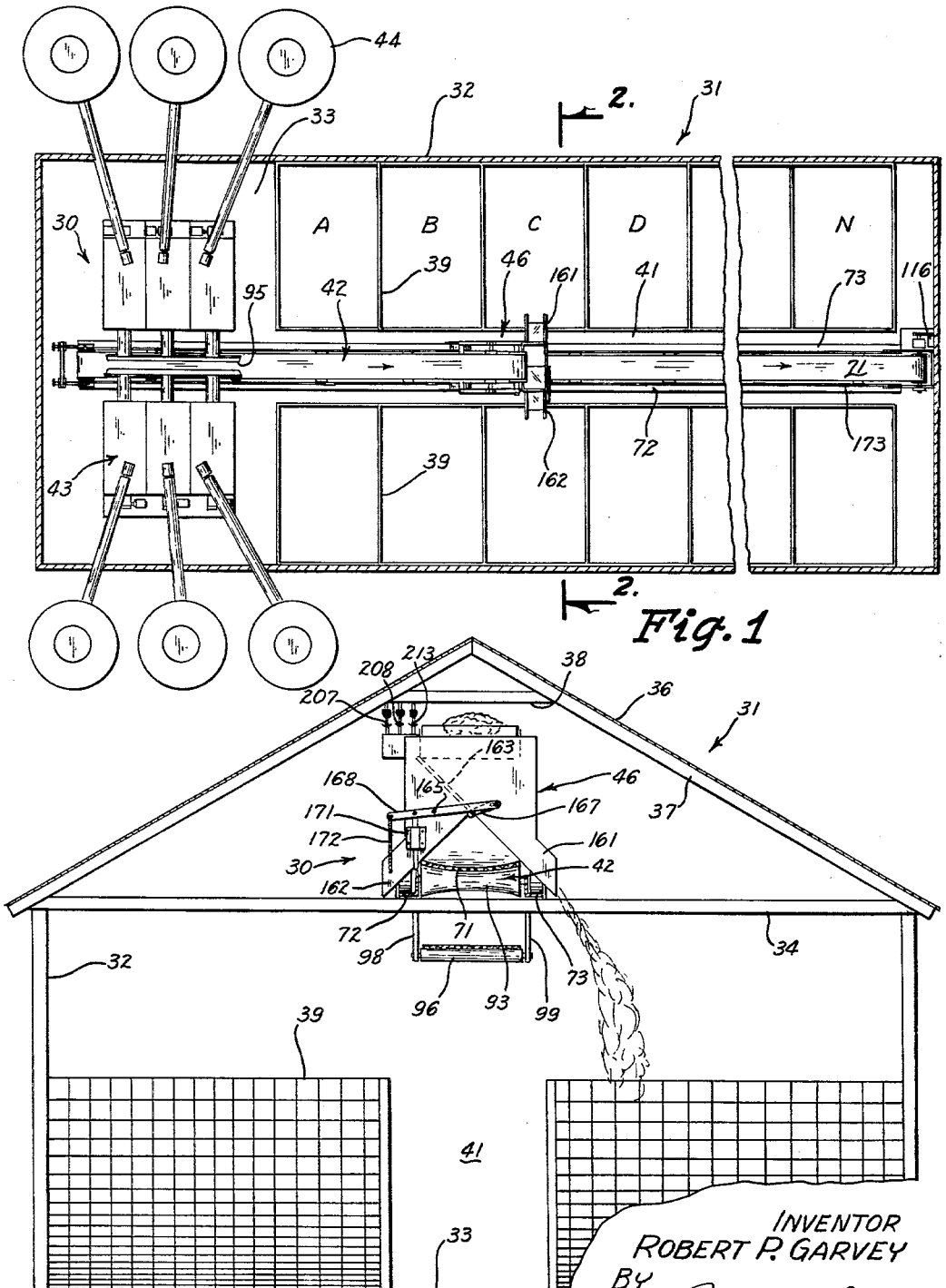
FIG. 1 is a plan view of the automatic feeding apparatus of the invention in assembled relation in a structure having a plurality of pens.
FIG. 2 is an enlarged sectional view taken along the line 2—2 of FIG. 1.

Referring to the drawing, there is shown in FIGS. 1 and 2 the livestock feeding apparatus of this invention indicated generally by the numeral 30 in assembled relation with a farm building 31 constructed to house livestock. The farm building 31 illustrated is commonly known as a hog house and consists of upright side walls 32 which define a floor area 33. The top sections of the side walls 32 are connected by a plurality of spaced horizontal joints 34. The entire building is covered by a roof 36 supported on rafters 37 which are reinforced adjacent their abutting ends by horizontally positioned collar beams 38.

As shown in FIG. 1, the floor area 33 is divided into a plurality of separate pens by partitions 39. The pens are aligned adjacent the side walls of the building with opposite ends spaced from each other to define a center aisle or alley 41. The number of pens in the building and the relative size of each pen is dependent upon the size and length of the building and the number of hogs confined to each pen. As illustrated the building 31 has an equal number of left and right pens indicated in number as A to N. Each of the pens constitutes a feed station for the hogs confined therein.

In the hog feeding operation illustrated the hogs are confined to the respective pens and are on a limited feed program. In this type of program the hogs are classified according to their age and weight and according to their utilization as breeding or market stock. Each of the separate classifications of hogs requires different amounts of rations and different types of rations. These rations consist of a mixture of bulk materials such as grains and forages and commercial feed supplements.

The feeding apparatus 30 of this invention selectively distributes the rations to the separate feeding stations in accordance with the requirements of each feeding station. As shown in FIG. 1, the feeding apparatus 30 comprises an elongated conveyer 42 which is positioned above and in alignment with the center aisle 41 of the building. Positioned adjacent the forward end of the conveyer 42 are a plurality of feed metering hopper units 43. The number of hopper units 43 may vary in accordance with the different types of ration requirements for the segregated hogs. For purposes of illustration the number of hopper units 43 is shown as six with three units on each side of the forward end of the conveyer 42. The rations in each of the hopper units 43 is supplied from separate storage bins 44 located outside of the building 31.

Each of the hopper units 43 is independently operable to selectively meter a controlled quantity of rations onto the conveyer 42. Operation of the conveyer 42 moves these rations to a truck or carriage 46 positioned on the conveyer 42. The truck 46 moves from station to station along the conveyer 42 and sequentially receives rations from the conveyer for directing these rations into selected feed stations. The truck 46 is controlled to move in a forward direction from feed station to feed station until the desired number of feed stations have been supplied with rations. The truck 46 is then returned to its initial starting position adjacent the first feed station illustrated as pen A.

As shown in FIG. 3, a conveyer 47 of an auger type is connected to the bottom of a storage bin 44 and has its opposite end positioned above a hopper unit 43. An electric motor 48 rotatably drives the auger of the conveyer 47 which in turn transports the rations from the storage bin 44 into the feed metering hopper unit 43. As shown in FIG. 3, the hopper unit 43 comprises a box 49 having a V-shaped bottom wall 51. Formed integral with the bottom wall 51 (FIG. 4) is a circular spout 52 which has a discharge opening 53 positioned slightly above the conveyer 42. Projecting across the bottom of the box into the opening 53 is an auger 54 which is drivably coupled to a power transmission unit 56. An electric motor 57 drives the power transmission unit 56 which in turn rotates the auger 54 moving the rations onto the conveyor 42. A bracket 58 mounts the power transmission unit 56 and electric motor 57 from the side of the box 49 opposite the spout 42.

When the quantity of rations in the box 49 falls below a predetermined level the electric motor 48 of the auger conveyer connected to the storage bin is energized. The motor 48 rotates the auger which in turn conveys rations from the storage bin into the box 49. When the box 49 is filled with rations the motor 48 is automatically turned off. This operation of the motor 48 is accomplished by the actuation of a switch 59.

As shown in FIG. 4, an upright channel member 61 is secured to the inside of the box 49. The upper and lower ends of the passage 62 formed by the channel member 61 and the side wall of the box 49 are open so that the rations in the box 49 may flow into and out of the upright passage 62. As shown in FIG. 5, a portion of the side wall of the box 49 which opens into the passage 62 has an opening 63 which is covered with a flexible diaphragm 64. A box-shaped housing 66 is positioned over the flexible diaphragm 64. Bolts 67 clamp the peripheral edges of the diaphragm 64 between the housing 66 and the side wall of the box 49 and secure the diaphragm 64 and the housing 66 to the side wall of the box 49. The switch 59 is mounted within the housing 66 and has an actuating lever 68 which is biased into engagement with the diaphragm 64 by a spring 69. The switch 59 is normally closed in response to the biasing action of the spring 69 and thus connects the motor 48 with the source of energy.

As the box 49 is being filled with rations the channel-shaped member 61 prevents the rations from bearing against the flexible diaphragm 64. As illustrated in FIG. 4, when the box 49 is substanitally full of rations a portion of the rations will flow into the passage 62. The weight of the rations in the passage 62 bears against the flexible diaphragm 64 compressing the spring 69 and moving the lever 68 to open the switch 59 thereby terminating the operation of the motor 48. When the level of the rations in the box 49 falls below the lower end of the channel member 61, the rations in the passage 62 will move downwardly away from the flexible diaphragm 64, thereby permitting the spring 69 to move the lever 68 to close the switch 59. The box 49 is thus automatically refillable until the supply of rations in the storage bin 44 is exhausted.

Each of the feed metering hopper units 43 and storage bins 44 illustrated in FIG. 1 is substantially identical in construction. The electric motors 57 of each of the hopper units 43 operate independently of each other with the duration of the operation of each motor controlled to meter a specific quantity of rations onto the conveyer 42.

As shown in FIG. 3, the conveyer 42 comprises an endless belt 71 positioned about a pair of substantially parallel angle rails 72 and 73 which are mounted on top of the joists 34. The rails are maintained in a spaced relationship by a plurality of spacer rods 74 which are secured at their opposite ends to the upright flanges of the rails 72 and 73.

As shown in FIG. 7, the forward end of the belt 71 extends about an idler roll 76 which is formed from hard rubber-like material and has a circumferentially grooved peripheral surface. Stub shafts 77 and 78 project from the opposite ends of the idler roll 76 and are mounted in bearings 79 and 81, respectively.

In order to tighten the belt 71 the idler roll 76 is provided with longitudinal adjustment. The bearings 79 and 81 are secured to upright slides 80 which are positioned in horizontal guides 82 secured to upright side plates 83. Bolts 84 secure the plates 83 to the forward ends of the angle rails 72 and 73. The side plates 83 have horizontally extended slots 86 through which the stub shafts 77 and 78 project. The position of the idler roll 76 with respect to the plates 83 is manually adjustable by screw and nut assemblies 87 which project through outwardly extended flanges 88 on the forward ends of the plates 83. From the flanges 88 the screws project toward the stub axles 77 and 78 and are connected to the slides 80. Rotation of the screw relative to its nut provides for longitudinal movement of the idler roll 76 with respect to the side plates 83.

As shown in FIG. 7, the belt 71 runs between the angle rails 72 and 73 and is retained in a central position by arm members 89 and 91 which engage the opposite edges of the belts. Referring to FIG. 11, it is seen that the arm member 89 is inwardly stepped and projects in an upward direction from the rail 72. Bolts 92 secure the arm member 89 to the rail 72. The arm member 91 is substantially identical in construction to the arm member 89. The arm members 89 and 91 are duplicated in spaced intervals along the length of the rails 72, 73 and thus function to maintain the top run of the belt 71 between the rails 72 and 73.

As illustrated in FIGS. 3 and 14, the top run of the belt 71 is supported on a plurality of hyperboloid-shaped rollers 93 which extend transversely between the rails 72 and 73. As best illustrated in FIG. 12, a rod 94 rotatably mounts a roller 93 on the upright flanges of the rails 72 and 73. The particular shape of the rollers 93 causes the upper run of the belt 71 to assume a concave contour which has the advantage of maintaining the rations on the central portion of the belt. The rations from the hopper units 43 are placed on the central portion of the belt 71 by outwardly diverging guide plates 95 positioned above the forward section of the belt and secured to the rails 72 and 73.

As shown in FIGS. 2 and 14 the lower run of the belt 71 rests on a plurality of transversely positioned rollers 96. The rollers 96 are spaced along the longitudinal extent of the rails 72 and 73 and function to maintain the lower run of the belt 71 above the center aisle 41. Each roller 96 is mounted on a shaft 97 carried by downwardly projected legs 98 and 99 secured at their upper ends to the rails 72 and 73. As shown in FIG. 10, shaft 97 is retained in the leg 98 with a screw 101. Referring to FIGS. 8 and 13, the bottom run of the belt 71 is illustrated as traveling below the first and the last roller 96 and over the remainder of the longitudinally spaced rollers 96.

As best illustrated in FIGS. 12 and 13, the belt 71 engages a drive roller 102 which is similar in construction to the idler roll 76. Stub shafts 103 and 104 projected from the opposite ends of the roller 102 are mounted in bearings 106 and 107, respectively. Upwardly projecting side plates 108 and 109 are secured to the rails 72 and 73 and carry the bearings 106 and 107. The side plates 108 and 109 are maintained in a spaced relationship by transverse rods 111 and 112 which are secured at their opposite ends with nuts 113 to the plates 108 and 109.

The stub shaft 104 is coupled to a power transmission unit 114 driven by an electric motor 116. As shown in FIG. 13, the power transmission unit 114 and motor 116 are mounted on a laterally extended plate 117 fastened to the side plate 108 by an angle member 118. The motor 116 is drivably coupled to the power transmission unit 114 by a belt and pulley assembly 119. On operation of the motor 116 the power transmission unit 114 rotates the drive roller 102 moving the upper run of the belt 71 in the direction of the arrow shown in FIG. 1.

The truck 46 (FIGS. 15 and 16) comprises a pair of right triangular-shaped frame members 121 and 122 which are maintained in a spaced relationship by a transverse beam 123 and a pair of angle members 124 and 126. The hypotenuse sections of the triangular frames 121 and 122 extend downwardly toward the forward section of the conveyer 42 with the adjacent side of the frame members extended substantially parallel to the rails 72 and 73. Frames 121 and 122 are supported on the rails 72 and 73 by two pairs of wheels 127 and 128 which ride on the horizontal flange of the respective rails. Each wheel has a radial flange 129 which coacts with the edge of a rail to align the truck on the rails 72 and 73. Inwardly extended axle units 131 secured to the lower corner sections of the frames 121 and 122 rotatably carry the wheels 127 and 128. The forward pair of wheels 128 are driven by a reversible electric motor 132.

As shown in FIG. 15, the electric motor 132 is mounted on a plate 133 carried by the transverse angle members 124 and 126 and is coupled to a power transmission unit 134 by a belt and pulley assembly 136. The power transmission unit 134 has laterally projected drive shafts 137 and 138. The outer ends of the drive shafts 137 and 138 are mounted in bearings 139 and 141 secured to the plate 133. The ends of the respective shafts 137 and 138 carry drive sprockets 142 and 143 which are in alignment with sprockets 144 and 146 secured to the wheels 128. Roller link chains 147 and 148 drivably connect the aligned sprockets. Operation of the motor 132 drives the power transmission unit 134 which in turn rotates the drive shafts 137 and 138. The torque of the drive shafts is transmitted to the leading pair of wheels 128 by the link chains 147 and 148 with the result that the truck 46 moves along the rails 72 and 73. When the output torque of the motor 132 is reversed the truck 46 will move along the rails 42 and 43 in an opposite direction.

As shown in FIG. 16, the upper run of the belt 71 runs through the truck 46 over a first roller 149 rotatably mounted by bearings 151 on the top sections of the frames 121 and 122. From the roller 149 the belt 71 is directed downwardly and forwardly for travel under a second roller 152 rotatably mounted on the frames 121 and 122 adjacent the wheels 128. A hyperboloid-shaped roller 153 is rotatably mounted by bearings 154 on the hypotenuse sections of the frames 121 and 122. The roller 153 engages the lower side of the upper run of the belt 71 forward of the first roller 149 and functions to maintain the concave contour of the belt during its upward movement toward the first cylindrical roller 149.

Rations carried by the belt 71 to the truck 46 are dumped into an open top housing 156 which is secured to the frames 121 and 122 by plates 157 and 158 (FIG. 17). The housing 156 has an inverted V-shaped bottom wall 159 formed with downwardly and outwardly diverging chutes 161 and 162 projected laterally from the opposite sides of the truck 46. The chutes 161 and 162 direct the rations dumped into the housing 156 by the belt 71 into one of the feed stations determined by the position of the truck 46 with respect to the conveyer 42.

In order to control the flow of the rations from the housing 156 to a single chute, a gate 163 is pivoted to the housing 156 adjacent the apex section of the bottom wall 159. The lower edge of the gate 163 is secured to a longitudinally extended rod 164 which projects at its opposite ends through the walls of the housing 156.

The gate 163 has first and second positions to direct the rations which are dumped into the housing 156 into either one of the chutes 161 and 162. These positions are controlled by a linkage 166 shown in FIG. 17, which comprises a crank arm 167 secured to the end of the rod 164. A lever 168 is pivoted to the free end of the crank arm 167 and fulcrumed on an upwardly extended push rod 169. The mid-section of the lever 168 is pivoted to the front of the housing by a pivot connection 165. A channel-shaped bracket 171 is secured to the housing 156 and forms an upwardly directed guide for the rod 169. The outer end of the lever 168 is connected to a coil spring 172 which projects in a downward direction and is secured to a portion of the chute 162. The spring 172 through the lever 168 provides an upwardly directed force on the crank arm 167 which holds the gate 163 in its alternative position as shown by the dotted lines in FIG. 17.

The push rod 169 is moved in an upward direction by a cam bracket 173, secured to the rail 72, and offset inwardly from the rail 72 in alignment with the rod 169. The rail 72 is provided with a plurality of brackets 173 which correspond in number and position to the number of feed stations which are located to one side of the aisle 41. The rod 169 is normally biased by the spring 172 in a downward direction to hold the collar 170 in engagement with the top of the bracket 171. In this position the lever 168 pivots about the pivotal connection 165 as shown by the broken line in FIG. 17, thereby moving the crank arm 167 in a downward direction to turn the gate 163 to its opposite position as shown by full line in FIG. 17.

The motor sequence control unit 174 is used with the feeding apparatus 30 as illustrated in FIG. 18. The control unit 174 comprises a base plate 176. Secured to the opposite sides of the mid-portion of the plate 176 are a pair of outwardly extended arms 177 and 178 which rotatably support a shaft 179. Positioned about the shaft 179 and connected in a driven relation thereto are a plurality of discs 181. Spacers (not shown) are positioned between adjacent discs 181 which are formed from electricially insulative material and are driven at a slow rate of speed by a synchronous motor 183 which operates at one revolution per minute. An endless drive 184, such as a belt or link chain engages a relatively large sprocket 186 secured to the shaft 179 to form a driving connection between the motor 183 and the discs 181.

A plurality of electric switches 187 corresponding in number to the number of discs 181 are positioned adjacent the periphery of the discs 181. A pair of arms 188 and 189 are secured to and extend laterally from the base plate 176 and provide a support for bolts 191 which retain the switches 187 adjacent to and in alignment with the discs 181. As shown in FIG. 19, each of the switches 187 has an actuator lever 192 which is normally positioned in close proximity to the peripheral surface of the adjacent disc. When an actuator lever 192 is in the normal position a switch 187 is open. The switches 187 are selectively closed by movement of their associated actuator levers away from the peripheral surfaces of corresponding discs 181. This is accomplished by the use of Z-shaped tabs 193 which are releasably attached to the peripheral surface of the discs by the use of holding screws 190 threadable into bores 195.

The tabs 193 (FIG. 18) extend in a series along the peripheral surface of a disc 181. The series of tabs 193 may be interrupted and of a variable length so as to intermittently open and close the associated switches 187 and control the period of time during which the switches are open or closed. The number and groups of tabs 193 on the several discs 181 vary to sequentially control the switches 187 with respect to each other to effect a sequential operation of the feeding apparatus 30.

The electrical circuit for the feeding apparatus 30 is illustrated in FIG. 20 and comprises a program timer 194 connected to an electrical power supply. The timer 194 is a commercial unit and functions to periodically connect the power supply to timer output leads 196 and 197. The timer 194 is normally adjusted to operate on four or six hour intervals as determined by the limited livestock feed program. Lines 198 and 199 connect the belt electric motor 116 with the output leads 196 and 197 and thus provide for the operation of the motor 116 during the interval that the timer 194 provides a connection between the power supply and the output leads 196 and 197. The operation of the motor 116 drives the power transmission unit 114 which in turn rotates the drive roller 102 moving the belt 71 in the direction of the arrow indicated in FIG. 3. The belt 71 moves continuously during the entire period as determined by the timer 194.

The synchronous motor 183 for the motor sequence control unit 174 is connected to the output leads 196 and 197 by lines 201 and 202. The motor 183 operates for the time period established by the timer 194.

Each of the motors 57 of the respective hopper units 43 is connected by separate lines 203 to one of the switches 187 of the control unit 174. The circuit for the motors 57 is completed by a common lead 204 which is connected to the timer lead 196. Each of the switches 187 is connected to the timer lead 197 by a line 206.

Two of the switches 187 are electrically coupled to exposed trolley wires 207 and 208 which are suspended from the collar beam 38 longitudinally of the conveyer 42 as shown in FIG. 2. A pair of sliding contacts or trolleys 209 and 211 are carried by the truck 46 and engage the exposed wires 207 and 208 and are electrically coupled to the truck motor 132. The circuit for the motor 132 is completed by a third sliding contact or trolley 212 which engages an exposed wire 213 suspended from the collar beam 38 adjacent the wires 207 and 208. A line 214 connects the wire 213 to the timer lead 196.

The operation of the feeding apparatus 30 is initially commenced by the timer 194 which connects the power supply to the belt motor 116 and the motor 183 of the control unit 174. The motor 116 drives the belt 71 in the direction of the arrow as indicated in FIGS. 1 and 3. The motor 183 rotates the discs 181 of the motor sequence control unit 174. The tabs 193 secured to the respective discs 181 control the duration and sequence of operation of the respective switches 187. This is accomplished by the location and extent of the tabs 193 with respect to the peripheral surface of the discs 181.

When one of the switches 187 connected to a motor 57 is closed the associated motor 57 operates and as shown in FIG. 4 rotates the auger 54 to meter rations onto the moving belt 71. The amount of rations dispensed by the hopper unit 43 is determined by the duration of operation of the motor 57. This time duration is controlled by the length of time that the associated switch 187 is held in a closed position by the tabs 193.

The rations are carried by the belt 71 to the truck 46. As a ration approaches the truck 46 it is elevated and dumped into the housing 156 as it moves over the roller 149. The gate 163 in the housing 156 directs the ration into a chute 161 or 162 which projects toward the selected feed station.

When the first switch 187 connected to the truck motor 132 is closed, the motor 132 operates to drive the truck along the rails 72 and 73 moving the truck 46 to the next feed station which is determined by the position of the cam bracket 173 on the rail 72. As illustrated in FIG. 17, movement of the truck 46 results in the engagement of the push rod 169 with the cam bracket 173. This movement of the push rod 169 actuates the linkage 166 resulting in the movement of the gate 163 to its opposite position. A second quantity of ration which may differ as to type and quantity relative to the first ration placed on the conveyer 42 is metered onto the belt 71 and carried thereby to the truck 46. At the truck 46 the belt 71 discharges the rations into the housing 156 which directs the rations to the chute 162 thereby guiding the rations into the feed station opposite the first feeding station.

The motors 57 of the several hopper units 53 are selectively energized according to the feed ration requirements of the separate feed stations. The feed hopper units 43 operate in sequence placing preselected feed rations in series on the moving belt 71 in a time relationship with the position of the truck 46 relative to preselected feed stations so that a predetermined feed ration is dispensed to a preselected feed station. This sequence of operations of the truck 46 and the hopper units 43 is continued until the nth feeding station is serviced. At this time the first switch 187 opens and the other switch 181 connected to the truck motor 132 is closed reversing the operation of the motor 132 causing the truck to return to a position adjacent the first feeding station A. At this time the timer 194 automatically disconnects the power supply at the output leads 196 and 197.

A modification of the feeding apparatus 30 is illustrated in FIGS. 21 to 24 and is indicated generally with the reference numeral 216. The feeding apparatus 216 comprises a feed hopper unit 217 which is similar in construction with the hopper unit 43 shown in detail in FIG. 4. The hopper unit 217 has a drive motor 218. The number of feed hopper units in the apparatus may be arbitrarily increased to provide for different types of rations.

An elongated conveyer 219 is mounted on the transverse joists 221 of a structure, such as a hog house. The forward section of the conveyer 219 is positioned below the discharge section of the hopper unit 217. A truck 222 is movably supported on the conveyer 219 and is intermittently moved along the conveyer to discharge rations into the respective separate feed stations.

Figure 21:
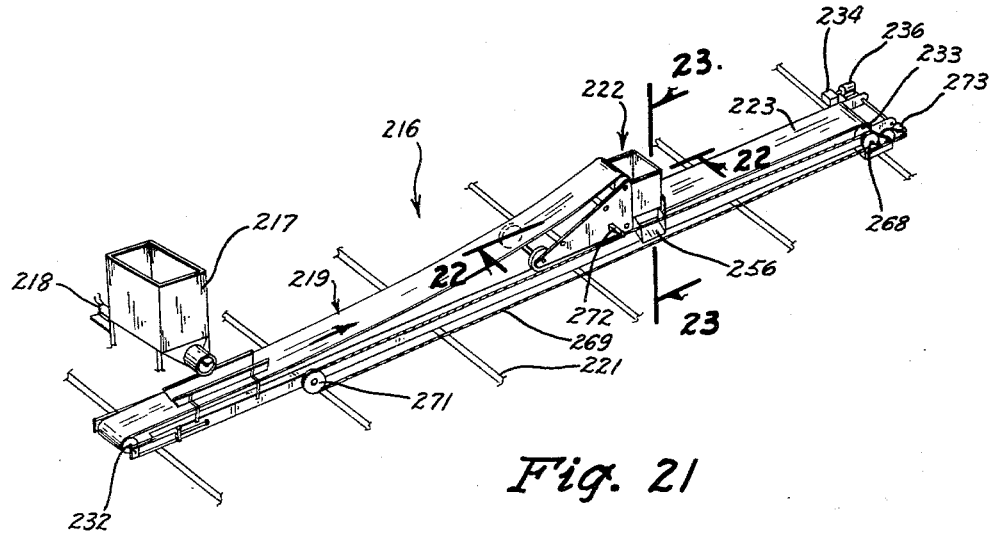
FIG. 21 is a perspective view of a modication of the feeding apparatus of FIG. 1.
Figure 22:
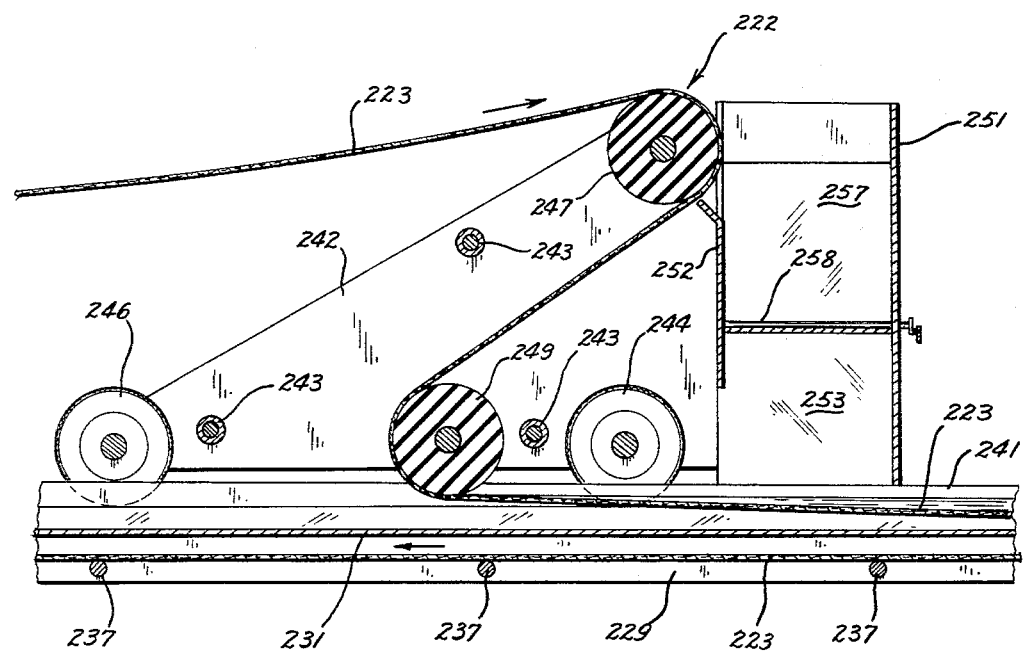
FIG. 22 is an enlarged sectional view taken along the line 22—22 of FIG. 21.
Figure 23:
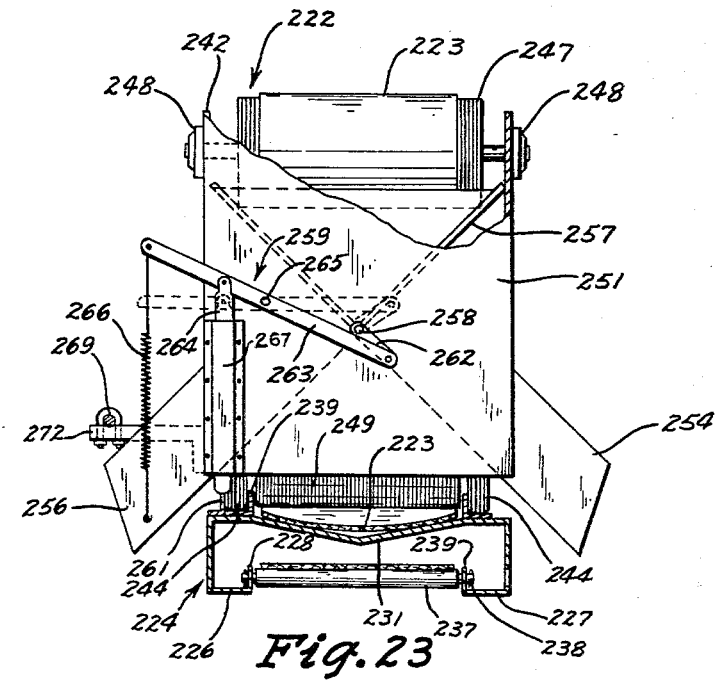
FIG. 23 is an enlarged sectional view taken along the line 23—23 of FIG. 21.

As shown in FIGS. 21 and 22 the conveyer 219 comprises an endless belt 223 positioned on an elongated sheet metal frame 224. The sheet metal frame 224 comprises a plurality of sections which are secured in an end-to-end relationship. Each metal frame 224 has an M-shaped transverse cross section as illustrated in FIG. 23. The lower sections 226 and 227 of the legs of the frame 224 extend toward each other and terminate in upwardly projected flanges 228 and 229. The top wall 231 of the frame 224 is of a broad V-shape having flat side portions which join with the top portions of the legs of the frame 224. The forward end of the belt 223 extends about an adjustable idler roller 232 and the rear end of the belt 223 extends about the drive roller 233. The roller 233 is drivably coupled to a power transmission unit 234 operated by an electric motor 236.

The lower run of the belt 223 is retained within the confines of the sheet metal frame 224 by a plurality of sleeves 237 which extend between the upright flanges 228 and 229 and are rotatably mounted on rods 238. The opposite ends of the rods 238 are carried on the flanges 228 and 229. The sleeves 237 are longitudinally spaced along the length of the frame 224 with about a four foot spacing between adjacent sleeves.

A pair of parallel angle rails 239 and 241 are secured to the opposite horizontal side sections of the top wall 231 of the frame 224 and form guides for the truck 222. The rails 239 and 241 have upwardly projected flanges positioned adjacent the opposite side edges of the belt 223 and function to retain the belt in the V-shaped section of the top wall 231.

The truck 222 comprises a frame 242 fabricated from a pair of upright triangular plates held in a spaced relationship by transverse tubular braces 243. As illustrated in FIGS. 22 and 23, a front pair of wheels 244 and a pair of rear wheels 246 are rotatably mounted on lower portions of the triangular plate members. Each wheel has a hard rubber tire positioned adjacent the outside surface of the associated rails 239 and 241. The wheels 244 and 246 support the truck 222 on the conveyer frame 224.

Extended transversely between the upper portions of the truck frame 242 is a first roller 247 which is rotatably mounted on the opposite triangular frame plates by bearings 248. The belt 223 is trained over the roller 247 and under a second roller 249 rotatably mounted on the frame 242 below and rearward of the first roller 247. The belt 223 moves under the second roller 249 so as to position it adjacent the top wall 231 of the conveyer sheet metal frame 224.

A housing 251 having an open top is attached to the forward section of the frame 242. The housing 251 has a rear wall which projects upwardly and rearwardly below the first roller 247 so that the rations carried by the belt 223 are dumped into the housing 251. The bottom wall 253 of the housing 251 is of an inverted V-shape and is integral with a pair of laterally extended spouts 254 and 256. Spouts 254 and 256 extend outwardly and downwardly beyond the sides of the frame 224 and function to guide the rations dumped into the housing 251 toward a feeding station.

The direction of flow of the rations from the housing 251 is controlled by a swingable gate 257 which is secured to a rod 258 having its opposite ends pivotally mounted on the side walls of the housing 251 adjacent the apex section of the bottom wall 253. The angular position of the gauge 257 is controlled by a linkage 259 which is operated by upwardly projected cam plates 261 secured to one edge of the top wall 231 of the frame 224. The cam plates 261 are spaced along the frame 224 according to the number of feed stations to be serviced.

The linkage 259 comprises a crank arm 262 secured to the end of the rod 258 and a lever 263 pivotally connected to the free end of the crank arm 262. The lever 263 is fulcrumed to an upwardly extended push rod 264. A pivotal connection 265 rotatably mounts the mid-section of the lever 263 to the housing 251. A coil spring 266 is connected to the free end of the lever 263 and a portion of the spout 256 and functions to bias the crank arm 262 through the lever 263 in an upward direction. A channel-shaped bracket 267 is positioned about the push rod 264 and is secured to the housing 252. The bracket 267 positions the lower end of the push rod in alignment with the upwardly extended cam plates 261 and functions as a guide for the push rod 264. As shown in FIG. 23, the cam plate 261 moves the push rod 264 in an upward direction against the biasing force of the spring 266 rotating the crank arm 262 about the pivot connection 265. The crank arm 262 moves the gate 257 to the full line position shown in FIG. 23. When the push rod 264 leaves the cam plate 261 the lever 263 will move to the broken line position shown in FIG. 23 rotating the crank arm 262 in an upward direction to turn the gate 257 to the broken line position.

The truck 222 travels on the angle rails 239 and 241 and as shown in FIG. 21 is pulled in forward and reverse directions by a winch unit 268, mounted on the rear end section of the sheet metal frame 224, and connected by a cable 269 to the truck 222. The cable 269 extends about a pulley 271 rotatably mounted on the forward section of the frame 224. From the pulley 271 the cable 269 extends to the truck and is attached thereto by an outwardly directed bracket 272. The winch unit 268 is operated in forward and reverse directions by a reversible electric motor 273.

Figure 24:
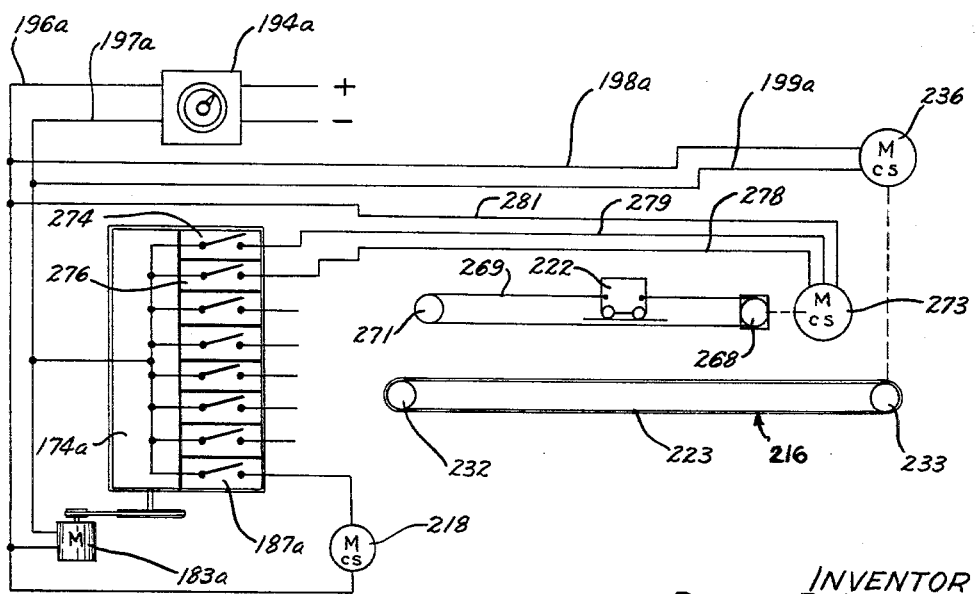
FIG. 24 is a block diagram of the electrical circuit of the feeding apparatus of FIG. 21.

The electrical control circuit for the feeding apparatus 216 is shown in FIG. 24 and is substantially identical to the electric control circuit for the feeding apparatus 30 as shown in FIG. 20. Corresponding components in the circuit shown in FIG. 24 are indicated with the same reference numerals with an added suffix a. The sequence control unit 174a is illustrated as operating the motor 218 of a single feed hopper unit. The additional switches 187a of the control unit 174a may be utilized to operate additional feed hopper units.

The program timer 194a functions to connect the electric power supply for a predetermined period of time and at selected intervals to the timer output leads 196a and 197a and thus energizes the belt motor 236 and the motor 183 of the control unit 174a. The motor 236 operates the power transmission unit 234 which rotates the drive roller 233 moving the belt 223 in the direction of the arrow shown in FIG. 21. The separate switches 187a of the control unit 174a are sequentially opened and closed in a timed relation with respect to each other to energize the hopper unit motor 218 which results in the metering of a specific quantity of rations onto the conveyer belt 223. The rations are carried by the belt 223 to the truck 222 and are dumped into the housing 251. The gate 257 in the housing directs the rations into one of the chutes 254 or 256 which discharges the rations into a feed station.

The position of the truck 222 with respect to the conveyer frame 224 determines the feed station and is controlled by the winch unit 268 which is driven by the reversible electric motor 273. The control unit 174a is electrically coupled to the reversible motor 273 by a pair of switches 274 and 276 which are identical in construction with the switches 187a and are controlled in a similar manner. The switches 274 and 276 are connected by lines 278 and 279 to the motor 273. The circuit is completed with a line 281 which connects the motor 273 with the timer output lead 196a.

The switches 274 and 276 are connected to the forward and reverse windings of the motor 273 and operate independent of each other to separately energize the motor which in turn provides power for the winch unit 268. The cable 269 is moved by the winch unit 268 pulling the truck 222 along the conveyer frame 224. The intermittent operation of the motor 273 moves the truck 222 from feed station to feed station.

The metering of the rations onto the belt 223 is coordinated with the movement of the truck 222 such that the rations are dumped into the housing 251 when the truck is at a feed station. When the truck 222 has serviced the $n$th or last feed station the winch unit motor 273 is reversed which results in the movement of the truck 222 back to the first feed station.

In order to speed up the reverse movement of the truck 222, the winch unit 268 may be provided with solenoid actuated high speed power transmission members (not shown). The solenoid is connected in the line coupled to the reverse drive windings of the electric motor 273 and thus is energized with the reverse operation of the motor 273. When the solenoid is energized, the power train of the winch unit 268 includes the high speed power transmission members resulting in an increase of speed of the truck 222 in a reverse direction back to the first feed station.

After this has been accomplished the program timer 194a automatically disconnects the electric power supply from the timer output leads 196a and 197a with the result that the control unit motor 183a and the belt motor 236 are turned off thereby terminating the operation of the control unit 174a and the movement of the belt 223.

In a specific installation of the feed apparatus 216 in a structure having oppositely aligned four foot wide feed pens extended in series, the operational time sequence is as follows. The apparatus 216 is designed to service the opposite feed pens in series in a one minute cycle. The belt 223 is driven in the direction of the arrow shown in FIG. 21 at a constant speed of three feet per second. The control unit 174a connects the hopper motor 218 to the source of electric power for a period of ten seconds. Each second the motor 218 runs, the feed hopper unit 217 discharges one pound of rations onto the belt. In ten seconds ten pounds of rations are metered onto the moving belt 223. The motor 218 may operate up to twenty-four seconds.

These rations are carried by the belt 223 to the truck 222 located adjacent one of the feed pens. The belt 223 as it moves through the truck 222 dumps the rations into the housing 251. The gate 257 in the housing deflects the rations laterally toward the selected feed pen. This operation is completed within twenty-seven seconds.

The control unit 174a operates the motor 273 for about one second to move the truck 222 forward about eight inches until the push rod 264 rides on the cam plate 261. Upward movement of the push rod 264 operates the linkage 259 to angularly move the gate 257 to its alternate position shown in full lines in FIG. 23.

The hopper motor 218 is again energized by the control unit 174a for the purpose of metering a selected quantity of rations onto the belt 223. The moving belt 223 carries these rations and dumps them into the truck 222. The gate 257 diverts the rations into the alternate feed pen. This operation is completed within twenty-seven seconds.

Energization of the motor 273 for five seconds by the control unit 174a results in forty inches of movement of the truck 222 along the conveyer 224. The truck 222 is now positioned to service the next feed pen.

This sequence of operations is continued until all the feed pens have been serviced with rations. After the last feed pen has been serviced the motor 273 is reversed by the operation of the control unit 174a causing the truck to return to its initial position.

In summary, the feeding apparatus of this invention is operable to distribute predetermined quantities and types of rations to preselected feeding stations and utilizes a conveyer which is positioned adjacent each of the feeding stations. The rations are metered onto the conveyer from a feed hopper and carried by the conveyer to a truck which functions to direct the predetermined ration into a selected feed station. A control unit coordinates the metering operation of the feed hopper with the location of the truck relative to the conveyer with the result that a predetermined quantity and type of ration metered onto the conveyer can be delivered into a preselected feed station. By adjusting the switching characteristics of the control unit the type and quantity of rations supplied to each of the feed stations serviced by the truck may be varied.

While there have been shown, described, and pointed out the fundamental features of the invention, it is to be understood that various omissions, substitutions, changes in form, and details of the apparatus illustrated may be made by those skilled in the art, without departing from the spirit of the invention, which is intended to be limited only as indicated by the scope of the following claims.

I claim:
1. A livestock feeding apparatus for distributing feed rations to predetermined feed stations comprising:
    (a) conveyer means positioned adjacent each of the feed stations,
    (b) motor means for said conveyer means,
    (c) a feed hopper including means to deliver feed rations from said hopper to said conveyer means,
    (d) a motor for said feed delivery means,
    (e) truck means constituting a support for a portion of said conveyer means, said truck means having chute means to direct feed rations toward the feed stations and means for discharging the feed rations from said conveyer means into said chute means,
    (f) means including a motor for moving said truck means relative to said conveyer means, and
    (g) control means operable to connect the conveyer motor means with a source of energy, said control means including means to sequentially connect and disconnect the truck motor to a source of energy to sequentially move said truck means to positions opposite said feed stations and means to connect the motor for said delivery means to a source of energy for a selected period of time whereby feed rations of predetermined quantities are placed on said conveyer means.

2. The feeding apparatus defined in claim 1 wherein:
    (a) said conveyer means includes an endless belt threaded through said truck means and driven by said conveyer motor means.

3. A livestock feeding apparatus for distributing feed rations to predetermined feed stations comprising:
    (a) conveyer means positioned adjacent and above each of the feed stations, said conveyer means including an endless conveyer and a first motor means for operating the conveyer,
    (b) a feed hopper including metering means having a second motor and operable to meter feed rations from said hopper to said conveyer,
    (c) truck means engageable with said conveyer means, said truck means having a housing including chute means to direct rations toward the feed stations and means operatively associated with the conveyer to discharge the rations carried by the conveyer into the housing,
    (d) means including a third motor operable to move said truck means relative to said conveyer means,
    (e) control means having a first means operable to connect the first motor to a source of energy thereby operating the conveyer, a second means to sequentially connect and disconnect the second motor to a source of energy thereby sequentially metering definite quantities for rations to the conveyer, and a third means to connect the third motor to a source of energy for preselected periods of time whereby the truck means is moved from feed station to feed station in a timed relationship with the actuation of the second means so as to discharge at a feed station the preselected ration therefor.

4. An apparatus for distributing bulk material to separate locations comprising:
    (a) rail means extended over said locations,
    (b) belt means positioned substantially parallel to said rail means,
    (c) roller means mounted on said rail means and engageable with said belt means,
    (d) first motor means drivably connected to one of said roller means to move the belt relative to the rail means,
    (e) a hopper including means for delivering bulk material from said hopper to the belt means,
    (f) a motor for said delivery means,
    (g) truck means having wheels engageable with said rail means, motor means drivably connected to at least one of said wheels to move the truck to the separate locations, chute means to direct the bulk material toward said locations, and means engageable with the belt means to discharge the bulk material carried thereby into said chute means, and
    (g) control means operable to connect the first motor means with a source of energy to move the belt means relative to the rail means, said control means including means to sequentially connect and disconnect the truck motor to a source of energy to sequentially move said truck means adjacent separate locations and means to connect the hopper motor to a source of energy for selected periods of time whereby predetermined amounts of bulk material are delivered onto the moving belt means, said amount of bulk material being carried by the belt means to the truck means for discharge into preselected locations.

5. The apparatus defined in claim 4 wherein said truck means includes:
   (a) a pair of chute means, and
   (b) gate means operable to selectively direct bulk material to said pair of chute means.

6. An apparatus for distributing bulk material to separate locations comprising:
   (a) pan means extended over said locations,
   (b) belt means positioned substantially parallel to said pan means,
   (c) rail means mounted on said pan means,
   (d) first motor means for moving the belt means relative to the pan means,
   (e) a hopper including means to deliver bulk material from said hopper to the belt means, and second motor means for said delivery means,
   (f) truck means having wheels engageable with said rail means, and chute means to direct the bulk material toward the location, and means engageable with the belt means for positioning the belt means so that the bulk material carried thereby is dumped into said chute means, and
   (g) third motor means operable to move the truck means on the rail means to the separate locations, and
   (h) control means operable to connect the first motor means with a source of energy thereby moving the said belt means relative to the pan means, said control means including means to sequentially connect and disconnect the third motor means to a source of energy thereby sequentially moving said truck means in alignment with the separate locations and means to connect the second motor to a source of energy for a preselected period of time whereby a preselected amount of bulk material is metered onto the moving belt means, said bulk materials carried by the belt means to the truck means and dumped into the truck chute means which discharges the bulk materials to one of the locations.

7. The apparatus defined in claim 6 wherein said truck means includes:
   (a) a pair of chute means, and
   (b) gate means operable to selectively direct bulk material to said pair of chute means.

8. The apparatus defined in claim 6 wherein:
   (a) said pan means has an M-shape in transverse cross section.

References Cited by the Examiner

UNITED STATES PATENTS

| 121,867 | 12/1871 | Gould | 198—186 |
| 2,730,228 | 1/1956 | Greeley et al | 198—186 |
| 3,052,364 | 9/1962 | Pelzer | 198—186 |
| 3,110,420 | 11/1962 | Brewer | 222—56 |
| 3,119,526 | 1/1964 | Sutton | 222—56 |

LOUIS J. DEMBO, *Primary Examiner.*

HADD S. LANE, *Examiner.*